(12) United States Patent
Zuo et al.

(10) Patent No.: US 10,650,827 B2
(45) Date of Patent: May 12, 2020

(54) COMMUNICATION METHOD, AND ELECTRONIC DEVICE THEREFOR

(71) Applicant: Samsung Electronics Co., Ltd., Gyeonggi-do (KR)

(72) Inventors: Xiang Zuo, Beijing (CN); Xuan Zhu, Beijing (CN)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/756,892

(22) PCT Filed: Mar. 22, 2016

(86) PCT No.: PCT/KR2016/002880
§ 371 (c)(1),
(2) Date: Mar. 1, 2018

(87) PCT Pub. No.: WO2017/039102
PCT Pub. Date: Mar. 9, 2017

(65) Prior Publication Data
US 2018/0268824 A1    Sep. 20, 2018

(30) Foreign Application Priority Data

Sep. 1, 2015 (CN) .......................... 2015 1 0552749
Mar. 8, 2016 (KR) ........................ 10-2016-0027710

(51) Int. Cl.
*G10L 17/02* (2013.01)
*H04L 9/08* (2006.01)
(Continued)

(52) U.S. Cl.
CPC .............. *G10L 17/02* (2013.01); *G10L 21/06* (2013.01); *H04L 9/00* (2013.01); *H04L 9/088* (2013.01);
(Continued)

(58) Field of Classification Search
CPC ... G10L 15/26; G10L 2015/088; G10L 15/02; G10L 15/1815; G10L 15/30; G10L 17/02;
(Continued)

(56) References Cited

U.S. PATENT DOCUMENTS 4,694,491 A * 9/1987 Horne .................. H04N 7/1675
                                                                  348/E7.056
5,815,577 A * 9/1998 Clark ...................... G06F 21/83
                                                                       380/52
(Continued)

FOREIGN PATENT DOCUMENTS

CN        102064937       5/2011
CN        102916869       2/2013
(Continued)

OTHER PUBLICATIONS

Chinese Office Action dated Dec. 28, 2018 issued in counterpart application No. PCT/KR2016/002880, 18 pages.
(Continued)

*Primary Examiner* — Akelaw Teshale
(74) *Attorney, Agent, or Firm* — The Farrell Law Firm, P.C.

(57) ABSTRACT

Provided is a method including: receiving an audio signal of a transmitter; detecting sensitive information in the audio signal based on content of the audio signal; encrypting the sensitive information by using characteristic information of a receiver; and transmitting the audio signal including the encrypted sensitive information.

15 Claims, 8 Drawing Sheets

(51) Int. Cl.
  *H04L 29/06* (2006.01)
  *G10L 21/06* (2013.01)
  *H04L 9/00* (2006.01)
  *H04W 12/00* (2009.01)
  *G10L 17/16* (2013.01)
  *H04W 12/06* (2009.01)

(52) U.S. Cl.
  CPC ........ *H04L 9/0825* (2013.01); *H04L 63/0428* (2013.01); *H04W 12/0013* (2019.01); *G10L 17/16* (2013.01); *H04L 63/0861* (2013.01); *H04W 12/00504* (2019.01); *H04W 12/06* (2013.01)

(58) Field of Classification Search
  CPC ..... G10L 25/72; G10L 15/1822; G10L 15/22; G10L 2015/223; G10L 25/78; G10L 15/065; G10L 17/04; G10L 17/22; G10L 13/00; G10L 15/063; G10L 15/083; G10L 15/20; G10L 15/265; G10L 17/20; G10L 2015/228; G10L 21/0208; G10L 25/18; G10L 25/90; G10L 13/033; G10L 15/08; G10L 15/16; G10L 15/183; G10L 15/25; G10L 15/32; G10L 17/00; G10L 17/06; G10L 17/08; G10L 17/16; G10L 17/18; G10L 19/018; G10L 2021/065; G10L 21/00; G10L 21/0364; G10L 21/06; G10L 21/10; G10L 21/16; G10L 25/06; G10L 25/54; G10L 25/63; G10L 25/93; H04L 63/0428; H04L 63/0823; H04L 2209/56; H04M 2203/6009; H04M 2203/609; H04M 3/42221; H04M 2203/301; H04M 2203/303; H04M 3/5175; H04M 3/5191; H04M 1/72525; H04M 2201/40; H04M 2203/401; H04M 2203/551; H04M 2203/6045; H04M 2242/10; H04M 3/42042; H04M 3/42059; H04M 3/42161; H04M 3/5166; H04M 2203/6027; H04M 2203/60; H04M 7/1295; H04M 1/72577; H04M 2203/558; H04M 3/493; H04M 3/51; H04M 3/5133; H04M 3/5183; H04M 3/567; H04M 3/568; H04M 7/0027; H04M 15/844; H04M 19/044; H04M 1/6075; H04M 1/72547; H04M 1/72569; H04M 1/72583; H04M 2203/1025; H04M 2203/40; H04M 2203/6081; H04M 2207/18; H04M 2250/10; H04M 2250/12; H04M 3/38; H04M 3/42068; H04M 3/42153; H04M 3/42187; H04M 3/42382; H04M 3/4285; H04M 3/523; H04M 3/5232; H04M 3/527; H04M 3/58; H04M 7/0012; H04M 7/0078
  See application file for complete search history.

(56) References Cited

U.S. PATENT DOCUMENTS

| | | | |
|---|---|---|---|
| 5,974,142 A * | 10/1999 | Heer | H04K 1/00 379/442 |
| 6,266,412 B1 | 7/2001 | Berenzweig et al. | |
| 7,921,292 B1 * | 4/2011 | Pauker | H04L 9/083 713/171 |
| 8,266,452 B2 * | 9/2012 | Dunn | H04K 1/00 713/193 |
| 8,503,645 B1 * | 8/2013 | Oliver | H04M 3/2281 379/201.01 |
| 8,782,409 B2 | 7/2014 | Murphy et al. | |
| 8,892,901 B2 | 11/2014 | Han | |
| 10,341,305 B2 | 7/2019 | Huang et al. | |
| 2003/0101349 A1 | 5/2003 | Wang | |
| 2005/0246527 A1 | 11/2005 | Gottwald | |
| 2007/0208867 A1 | 9/2007 | Yu et al. | |
| 2007/0245155 A1 * | 10/2007 | Mimura | G06F 21/32 713/186 |
| 2009/0019553 A1 | 1/2009 | Narayanaswami | |
| 2009/0041231 A1 | 2/2009 | Yang et al. | |
| 2009/0199015 A1 * | 8/2009 | Krishnapuram | G06F 21/6245 713/193 |
| 2010/0002882 A1 | 1/2010 | Rieger et al. | |
| 2012/0005475 A1 * | 1/2012 | Inagaki | H04N 7/147 713/150 |
| 2013/0272518 A1 | 10/2013 | Wu et al. | |
| 2014/0143550 A1 * | 5/2014 | Ganong, III | G06F 21/32 713/189 |
| 2014/0237256 A1 | 8/2014 | Ben Ayed | |
| 2015/0134959 A1 | 5/2015 | Wong et al. | |
| 2016/0301674 A1 * | 10/2016 | Uetabira | H04W 4/029 |

FOREIGN PATENT DOCUMENTS

| | | | |
|---|---|---|---|
| CN | 103236926 | 8/2013 | |
| CN | 104023332 | 9/2014 | |
| CN | 104270517 | 1/2015 | |
| CN | 104601818 | 5/2015 | |
| JP | 2008-217652 | 9/2008 | |
| JP | 2012-080152 | 4/2012 | |
| JP | 2015-099289 | 5/2015 | |
| KR | 1020030083273 | 10/2003 | |
| KR | 1020080027572 | 3/2008 | |
| KR | 1020090011477 | 2/2009 | |
| KR | 1020100050638 | 5/2010 | |
| WO | WO-2009067322 A1 * | 5/2009 | H04K 1/00 |
| WO | WO 2015/117451 | 8/2015 | |

OTHER PUBLICATIONS

International Search Report dated Jun. 30, 2016 issued in counterpart application No. PCT/KR2016/002880, 23 pages.
European Search Report dated Mar. 16, 2018 issued in counterpart application No. 16842068.5-1210, 9 pages.
Chinese Office Action dated Oct. 21, 2019 issued in counterpart application No. 201510552749.1, 14 pages.
Chinese Office Action dated Jul. 3, 2019 issued in counterpart•application No. 201510552749.1, 16 pages.

* cited by examiner

COMMUNICATION METHOD, AND ELECTRONIC DEVICE THEREFOR

PRIORITY

This application is a National Phase Entry of PCT International Application No. PCT/KR2016/002880, which was filed on Mar. 22, 2016, and claims priority to Chinese Patent Application No. 201510552749.1, which was filed on Sep. 1, 2015 and Korean Patent Application No. 10-2016-0027710, which was filed on Mar. 8, 2016, the contents of each of which are incorporated herein by reference.

TECHNICAL FIELD

The present disclosure relates to an audio communication encrypting method and device, an audio communication decrypting method and device, and an audio communication encrypting and decrypting system.

BACKGROUND ART

Data encryption and decryption is in the spotlight, and data encryption and decryption is an important requirement in communication technology. Recently, with the popularity of personal digital devices such as smartphones, audio is gradually becoming the mainstream of communication media. In this situation, there is an increasing need for an audio signal encrypting and decrypting process. An encrypting and decrypting algorithm based on public keys and private keys may be mainly used for audio signal encryption and decryption. In the encrypting and decrypting algorithm based on public keys and private keys, a transmitter must use a public key of a receiver to encrypt an audio signal. After the audio signal is encrypted, only the receiver that has previously provided the public key may decrypt the audio signal by using its private key. However, a method of using the encrypting and decrypting algorithm based on public keys and private keys is costly. Moreover, in a case where several persons communicate with each other as in WeChat, the cost may increase significantly and the confidentiality of information transmission may not be guaranteed.

DETAILED DESCRIPTION OF THE INVENTION

Technical Problem

Various embodiments are to provide a reduced cost and an improvement in information transmission confidentiality in comparison with the case of using a public key and a private key in an audio signal encrypting and decrypting process as in the related art.

Technical Solution

According to some embodiments, a communication method using an electronic device includes: receiving an audio signal of a transmitter; detecting sensitive information in the audio signal based on content of the audio signal; encrypting the sensitive information by using characteristic information of a receiver; and transmitting the audio signal including the encrypted sensitive information.

Advantageous Effects of the Invention

Various embodiments may provide a reduced cost and an improvement in information transmission confidentiality in comparison with the case of using a public key and a private key in an audio signal encrypting and decrypting process as in the related art.

BEST MODE

Figure 1:
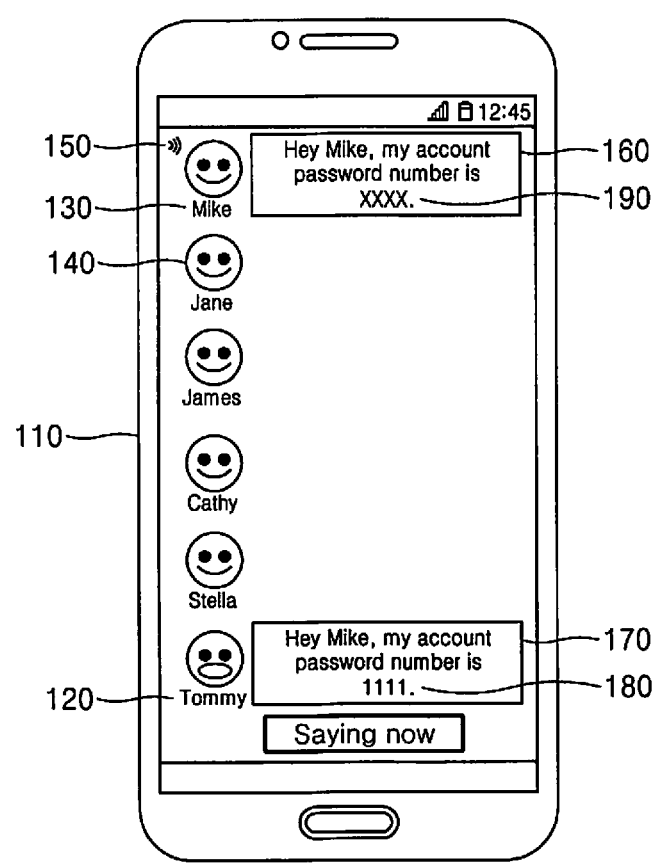
FIG. 1 is a diagram illustrating a state in which communication is performed through an electronic device, according to an embodiment.

According to some embodiments, a communication method using an electronic device includes: receiving an audio signal of a transmitter; detecting sensitive information in the audio signal based on content of the audio signal; encrypting the sensitive information by using characteristic information of a receiver; and transmitting the audio signal including the encrypted sensitive information.

In an embodiment, the content of the audio signal may be a meaning of the audio signal or an audio characteristic of the audio signal.

In an embodiment, the content of the audio signal may be a meaning of the audio signal, and the detecting of the sensitive information based on the meaning of the audio signal may include detecting the sensitive information based on a context of an audio signal in a communication history of the transmitter, or whether the audio signal of the transmitter includes a predetermined important keyword or a predetermined important keyword type.

In an embodiment, the encrypting of the sensitive information may include encrypting the audio signal including the sensitive information.

In an embodiment, the characteristic information of the receiver may include at least one of voiceprint information, fingerprint information, face information, vein pattern information, palm print information, and iris information of the receiver.

In an embodiment, the detecting of the sensitive information based on whether the audio signal of the transmitter includes the predetermined important keyword or the predetermined important keyword type includes: identifying the audio signal of the transmitter as a word list; and text-matching the identified word list with the predetermined important keyword or the predetermined important keyword type.

In an embodiment, the audio signal may be divided into at least one or more segments based on a semantic analysis of the audio signal, and the at least one or more segments may be transmitted to at least one or more receivers in a distributed manner.

According to some embodiments, a communication method using an electronic device includes: receiving an audio signal including sensitive information that is detected based on content of the audio signal and is encrypted by using characteristic information of a receiver; acquiring the characteristic information of the receiver; and decrypting the encrypted sensitive information by using the characteristic information of the receiver.

In an embodiment, the content of the audio signal may be a meaning of the audio signal or an audio characteristic of the audio signal of the transmitter.

In an embodiment, the characteristic information may include at least one of voiceprint information, fingerprint information, face information, vein pattern information, palm print information, and iris information of the receiver.

In an embodiment, the acquiring of the voiceprint information may include: detecting a respiratory signal from the receiver; and determining, based on the respiratory signal, whether the voiceprint information is generated from the receiver.

According to some embodiments, an electronic device includes: a receiving unit configured to receive an audio signal of a transmitter; a control unit configured to detect sensitive information in the audio signal based on content of the audio signal and encrypt the sensitive information by using characteristic information of a receiver; and a transmitting unit configured to transmit the audio signal including the encrypted sensitive information.

In an embodiment, the content of the audio signal may be a meaning of the audio signal or an audio characteristic of the audio signal.

In an embodiment, the control unit may be further configured to determine the receiver of the audio signal based on a name of the receiver detected in the audio signal, or a context of an audio signal in a communication history of the transmitter.

According to some embodiments, an electronic device includes: a receiving unit configured to receive an audio signal including sensitive information that is detected based on content of the audio signal and is encrypted by using characteristic information of a receiver; and a control unit configured to acquire the characteristic information of the receiver and decrypt the encrypted audio signal by using the characteristic information of the receiver.

In an embodiment, the content of the audio signal may be a meaning of the audio signal or an audio characteristic of the audio signal.

In an embodiment, the characteristic information may include at least one of voiceprint information, fingerprint information, face information, vein pattern information, palm print information, and iris information of the receiver.

In an embodiment, the control unit may be further configured to detect a respiratory signal from the receiver when the voiceprint information is acquired, and determine, based on the detected respiratory signal, whether the voiceprint information is generated from the receiver.

According to some embodiments, a computer-readable recording medium has recorded thereon a program for executing a communication method using an electronic device, the communication method including: receiving an audio signal of a transmitter; detecting sensitive information in the audio signal based on content of the audio signal; encrypting the sensitive information by using characteristic information of a receiver; and transmitting the audio signal including the encrypted sensitive information, or a communication method using an electronic device, the communication method including: receiving an audio signal including sensitive information that is detected based on content of the audio signal and is encrypted by using characteristic information of a receiver; acquiring the characteristic information of the receiver; and decrypting the encrypted sensitive information by using the characteristic information of the receiver.

MODE OF THE INVENTION

Hereinafter, embodiments of the present disclosure will be described in detail with reference to the accompanying drawings so that those of ordinary skill in the art may easily implement the embodiments. However, the present disclosure may be embodied in many different forms and should not be construed as being limited to the embodiments set forth herein. In addition, portions irrelevant to the description of the present disclosure will be omitted in the drawings for a clear description of the present disclosure, and like reference numerals will denote like elements throughout the specification.

Although certain terms may be used herein to describe various elements or components, these elements or components should not be limited by these terms. These terms are only used to distinguish one element or component from another element or component.

Throughout the specification, when an element is referred to as being "connected" to another element, it may be "directly connected" to the other element or may be "electrically connected" to the other element with one or more intervening elements therebetween. Also, when an element is referred to as being "connected" to another element, it may be in a state capable of performing data communication with the other element through signal transmission/reception.

Also, when something is referred to as "including" a component, another component may be further included unless specified otherwise.

The accompanying drawings may be schematically illustrated to describe an embodiment of the present disclosure, and some dimensions may be exaggerated for clarity. Similarly, some portions of the drawings may be arbitrarily represented.

The terms used herein are for the purpose of describing particular embodiments only and are not intended to limit the present disclosure. The terms used herein are those general terms currently widely used in the art in consideration of functions in regard to the present disclosure, but the terms may vary according to the intentions of those of ordinary skill in the art, precedents, or new technology in the art. Also, in some cases, there may be terms that are optionally selected by the applicant, and the meanings thereof will be described in detail in the corresponding portions of the description of the present disclosure. Thus, the terms used herein should be understood not as simple names but based on the meanings of the terms and the overall description of the present disclosure.

As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

The accompanying drawings and the embodiments described herein are for the purpose of describing the present disclosure through some of the various embodiments of the present disclosure, and the present disclosure is not limited thereto.

Hereinafter, the present disclosure will be described in detail with reference to the accompanying drawings.

FIG. 1 is a diagram illustrating a state in which communication is performed through an electronic device 110, according to an embodiment.

As illustrated in FIG. 1, the electronic device 110 may be a smartphone; however, this is merely an embodiment and it is not limited to a smartphone. For example, the electronic device 110 may be any device having an audio signal receiving function and an audio signal playing function, such as a tablet PC, a notebook computer (laptop computer), a desktop, a wearable device, a smart TV, a mobile phone, a panel PC (panel computer), a portable multimedia player (PMP), or a personal digital assistant (PDA); however, the type of the electronic device 110 is not limited thereto.

FIG. 1 illustrates an embodiment in which communication between a plurality of parties is performed through an electronic device. In particular, FIG. 1 illustrates a screen displayed on an electronic device of Tommy 120 that is the most recently speaking person or the currently speaking person, among the persons participating in the communication in an embodiment.

In an embodiment, each of the persons participating in the communication may be displayed as an icon 140 on the screen of the electronic device, and a name 120 or 130 of each of the communication participants may be displayed under the icon. In an embodiment, a profile picture of each participant may be displayed instead of the icon 140. In another embodiment, the icon of the person currently speaking and the icon of the person not currently speaking may be different from each other. For example, as illustrated in FIG. 1, the icon representing the recently or currently speaking Tommy 120 may be displayed as an icon shaped like a speaking face with an open mouth, unlike the icons of other participants.

In an embodiment, FIG. 1 illustrates a situation where Tommy 120 says "Hey Mike, my account password number is 1111." In this case, Tommy 120 may be a transmitter transmitting an audio signal, and Mike 130 may be a receiver to receive the words of Tommy 120 according to the description below with reference to FIG. 5. The audio signal may be a signal in the audio range and may refer to a signal of 20 Hz to 20 kHz that is a human audible frequency, but is not limited thereto.

In an embodiment, Mike 130 determined as a receiver to receive the audio signal transmitted by Tommy 120 may hear a voice of the audio signal transmitted by Tommy 120. In this case, in an embodiment, a voice indication 150 may indicate that Mike 130 may hear a voice of the audio signal transmitted by Tommy 120. A method of displaying the voice indication 150 is not limited to that illustrated in FIG. 1 and may vary according to various embodiments, and the voice indication 150 may not be separately displayed on the screen. In an embodiment, a user of the electronic device 110 may hear the voice by pressing the voice indication 150 or may not hear the voice by not pressing the voice indication 150. In another embodiment, the audio signal of the transmitter Tommy 120 may be converted into not only voices but also texts 160 and 170 to be used for communication.

In an embodiment of FIG. 1, it may be seen that sensitive information may be a number "1111" 180 that is an account password number. In this case, in the text 160 capable of being viewed by the receiver, the sensitive information may be seen as "XXXX" 190 in an encrypted and hidden form. Displaying the sensitive information as "XXXX" 190 when the sensitive information is encrypted and hidden in the text is merely an embodiment, and the present disclosure is not limited thereto and it may also be displayed in other forms. In an embodiment, when the sensitive information is encrypted and hidden as "XXXX" 190 in text 160, an encrypted portion in the corresponding audio signal may be heard as noise.

In an embodiment, the encrypted audio signal may be transmitted to all of the communication participants in an encrypted form, or may be transmitted only to a particular receiver in an encrypted form. In order to protect the communication electronic device user from noise, a shielded audio file or a blank audio file may be used, the details of which will be described below.

In an embodiment, by using the characteristic information of each of a plurality of users, an audio signal of each user may be encrypted separately. In an embodiment, an audio signal that is secret to other users may be decrypted by using the characteristic information of each user.

An encrypting and decrypting process thereof and its principles will be described below.

Figure 2:
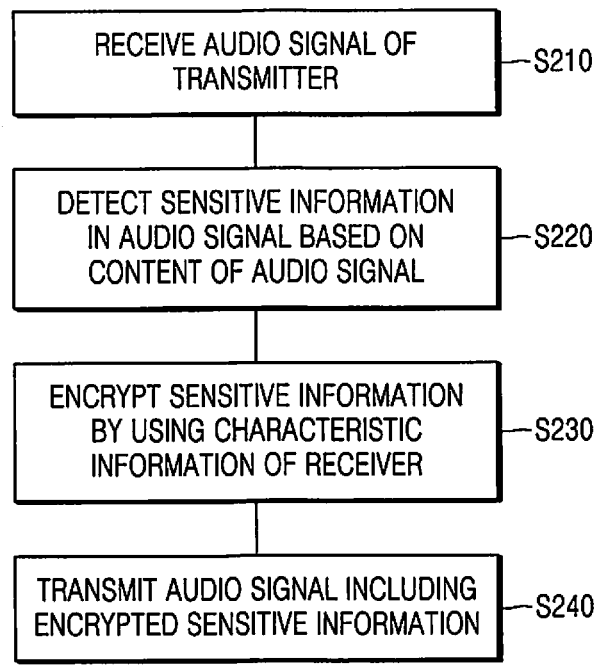
FIG. 2 is a flowchart of an audio communication method using an electronic device according to an embodiment.

FIG. 2 is a flowchart of an audio communication method using an electronic device according to an embodiment.

In operation S210, an audio signal of a transmitter may be received. In an embodiment, a receiving unit of the electronic device may receive the audio signal from the transmitter.

In operation S220, sensitive information in the audio signal may be detected based on the content of the audio signal. In an embodiment, the sensitive information may include, but is not limited to, a bank account number and a password number.

In an embodiment, when it is determined in operation S220 that the audio signal of the transmitter does not include the sensitive information, the audio signal may be transmitted to a receiver without being encrypted.

In an embodiment, when the audio signal of the transmitter includes a predetermined important keyword or a predetermined important keyword type, it may be determined that the audio signal includes the sensitive information. For example, since the important keyword "password" is included in the transmitters audio signal "password is XXXXXX", it may be determined that the audio signal includes the sensitive information. In this case, "XXXXXX" following the important keyword "password" may be detected as the sensitive information.

In an embodiment, when the audio signal of the transmitter includes a series of number-type audio segments, since the number-type audio segment corresponds to an important keyword type that is likely to be the sensitive information, the audio segment may be treated as the sensitive information.

In an embodiment, the context of the audio signal in a communication history of the transmitter may be used to determine whether the audio signal of the transmitter includes the sensitive information. For example, as a result of checking the communication history, when a previous audio signal includes a word such as "bank account number" and a current audio signal includes number information, the number information may be treated as the sensitive information of the bank account number.

In an embodiment, an audio characteristic of the audio signal of the transmitter may be used to detect whether the audio signal of the transmitter includes the sensitive information. The audio characteristic may include, but is not limited to, a volume characteristic of the audio signal. For example, when an audio chat is being performed between users, the volume may be reduced when the sensitive information is included. That is, when the volume of a particular segment in the audio signal of the transmitter is less than the volume of the other content portion of the audio signal, or when the volume difference therebetween is greater than a predetermined threshold, the particular segment may correspond to the sensitive information.

In an embodiment, a brainwave signal of the transmitter may be analyzed to detect the sensitive information. As a result of analyzing the brainwave signal of the transmitter, when it is recognized that the transmitter is important for a particular portion of the audio signal, the particular portion of the audio signal may be classified as the sensitive information, and when it is recognized that the transmitter is not important for a particular portion of the audio signal, the particular portion of the audio signal may not be classified as the sensitive information.

In operation S230, the sensitive information may be encrypted by using characteristic information of the receiver.

In an embodiment, the characteristic information of the receiver may be extracted.

In an embodiment, the characteristic information of the receiver may be, but is not limited to, at least one of voiceprint information, fingerprint information, face information, vein pattern information, palm print information, and iris information of the receiver. Any information representing a unique characteristic of the receiver may be treated as the characteristic information. For example, in an acoustic spectrum transmitting speech information, the voiceprint information may have strong identifiability and high stability. The voiceprint information may be effectively used in audio signal encryption to increase the confidentiality of encryption.

In an embodiment, the characteristic information of the receiver may be used to encrypt the audio signal including the sensitive information.

In operation S240, the audio signal including the encrypted sensitive information may be transmitted. In an embodiment, the audio signal including the encrypted sensitive information may be transmitted to a decrypting device. In an embodiment, when the encrypted audio signal is transmitted, a shielded audio file or a blank audio file may be transmitted together with the audio signal.

In an embodiment, the shielded audio file may be an audio file including audio such as music, songs, or natural sounds that are pleasant to the ears of the user of the electronic device 110, and the shielded audio file may be used to protect the user from the noise that may be generated when the encrypted sensitive information or the encrypted audio signal including the sensitive information is played.

In this case, the types of audio that may be included in the shielded audio file may include, but are not limited to, musics, songs, or natural sounds that are pleasant to the ears of the user.

In an embodiment, the blank audio file may be an audio file with no audio. In an embodiment, the shielded audio file or the blank audio file may protect the user from the noise by being played together with the noise or by being played instead of the noise. In an embodiment, when the receiver may not decrypt the encrypted audio signal or may not decrypt the encrypted sensitive information in the audio signal, the receiver may hear the shielded audio file or the blank audio file instead of the noise.

Figure 3:
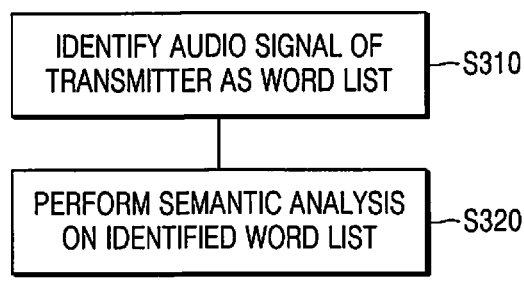
FIG. 3 is a flowchart illustrating a process of detecting whether an audio signal includes sensitive information according to an embodiment.

FIG. 3 is a flowchart illustrating a process of detecting whether an audio signal includes sensitive information according to an embodiment. When the audio signal of the transmitter includes a predetermined important keyword or a predetermined important keyword type, it may be determined that the audio signal of the transmitter includes the sensitive information.

In operation S310, the audio signal of the transmitter may be identified as a word list. In an embodiment, audio identification may be performed by using a method based on a Hidden Markov Model (HMM)-deep neural network (DNN); however, the present disclosure is not limited thereto. Various audio identification methods may be used to identify the audio signal of the transmitter.

In operation S320, a semantic analysis of the identified word list may be performed to detect whether the audio signal of the transmitter includes the sensitive information.

In an embodiment the identified word list may be text-matched with a predetermined important word list to detect whether the audio signal of the transmitter includes the sensitive information.

In an embodiment, after detecting whether the audio signal of the transmitter includes the sensitive information, it may be possible to set a state indicator indicating whether the audio signal includes the sensitive information according to the determination result. For example, when it is determined that the audio signal includes the sensitive information, the state indicator may be set to 1, and when it is determined that the audio signal does not include the sensitive information, the state indicator may be set to 0.

Figure 4:
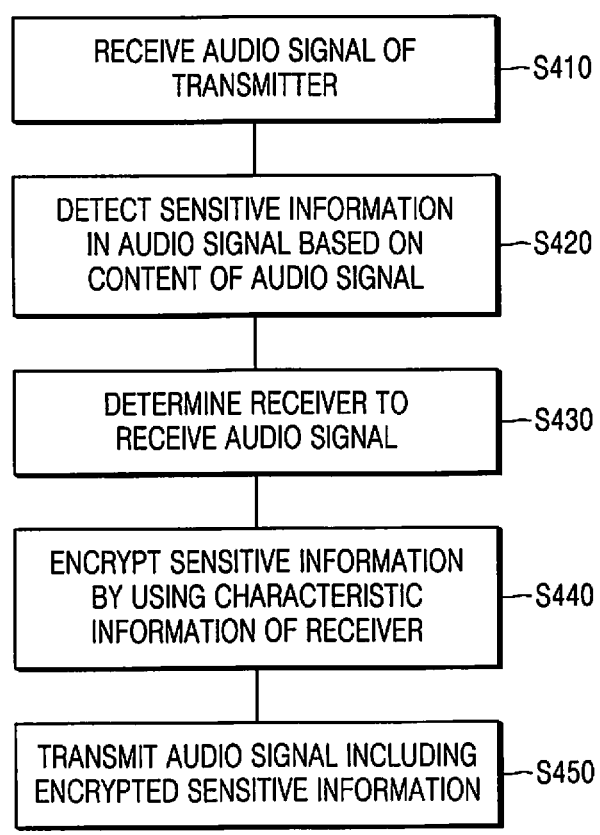
FIG. 4 is a flowchart of an audio communication method in communication between a plurality of parties using an electronic device according to an embodiment.

FIG. 4 is a flowchart of an audio communication method in communication between a plurality of parties using an electronic device according to an embodiment.

FIG. 4 is a flowchart illustrating an additional operation (S430) of determining a receiver to receive an audio signal in the encrypting method of FIG. 2.

Operation S430 is an operation of determining a receiver in the case of communication in which several receivers are present, and may be omitted when there is one receiver.

Since operations S410, S420, S440, and S450 perform the same principles as operations S210, S220, S230, and S240 of FIG. 2, detailed descriptions thereof will be omitted for simplicity of description.

In operation S410, an audio signal of a transmitter may be received.

In operation S420, sensitive information in the audio signal may be detected based on the content of the audio signal.

In operation S430, a receiver to receive the audio signal may be determined. A detailed description of operation S430 is given in the detailed description of the present disclosure with reference to FIG. 5 below.

In operation S440, the sensitive information may be encrypted by using characteristic information of the receiver.

In operation S450, the audio signal including the encrypted sensitive information may be transmitted. In an embodiment, the audio signal including the encrypted sensitive information may be transmitted to a decrypting device.

Figure 5:
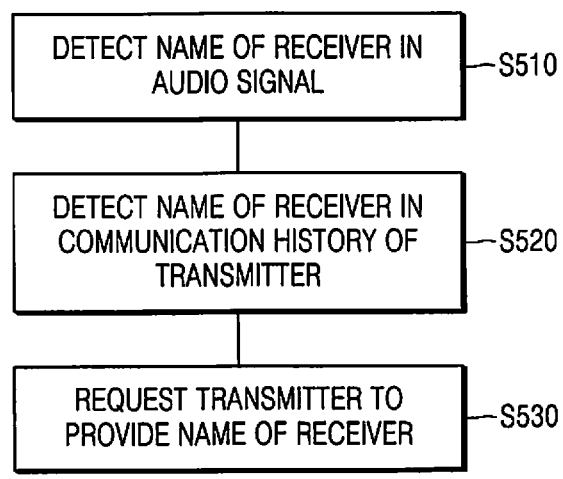
FIG. 5 is a flowchart illustrating a process of determining a receiver to receive an audio signal of a transmitter according to an embodiment.

FIG. 5 is a flowchart illustrating a process of determining a receiver to receive an audio signal of a transmitter according to an embodiment.

In operation S510, a name of the receiver may be detected in the audio signal. In an embodiment, the audio signal of the transmitter may also include the name of the receiver together with the sensitive information. A sentence "Transmit password 123456 to user A" is an example. In operation S510, a semantic analysis result of the audio signal of the transmitter may be text-matched with a predetermined name list. The semantic analysis result may include, but is not limited to, the word list identified in operation S310 and the semantic analysis performed in operation S320. The receiver of the audio signal of the transmitter may be determined as a result of the text match.

In operation S520, in an embodiment, when the name of the receiver is not detected in the audio signal of the transmitter in operation S510, the name of the receiver may be detected in a communication history of the transmitter.

In an embodiment, when the communication history includes the name of the receiver, a receiver of a current audio signal may be determined based on the name of the receiver. For example, when the communication history includes a sentence "User A, record my bank account", the receiver of the current audio signal may be user A.

In operation S530, in an embodiment, when the receiver of the audio signal of the transmitter is not determined in operation S520, the transmitter may be requested to provide the name of the receiver.

The transmitter may provide the name of the receiver by using audio synthesis or text information. A method of providing the name of the receiver may be determined according to an audio communication platform. For example, when the communication platform is a text interface, a dialog box including text information for requesting to provide the receiver name may pop up. When the communication platform is a pure audio interface without text, the transmitter may be requested to provide the receiver name through a synthesized audio request.

As described above, at least one of operations S510, S520, and S530 may be performed to determine the receiver to receive the audio signal of the transmitter.

In an embodiment, the user may preselect at least one of operations S510, S520, and S530.

In an embodiment, the mutual order of operations S510, S520, and S530 for determining the receiver to receive the audio signal may vary according to cases.

When it is determined that there are several receivers to receive the audio signal of the transmitter after at least one of operations S510, S520, and S530, the audio signal of the transmitter may be divided into at least one or more segments based on the semantic analysis of the audio signal of the transmitter.

In an embodiment, when there are a plurality of receivers, the entirety of the undivided audio signal may be transmitted to the plurality of receivers.

In an embodiment, when there are a plurality of receivers, the segments of the audio signal of the transmitter may be divided so that some segments may be transmitted to some receivers and some of the other segments may be transmitted to the other receivers. In this case, the audio signal of the transmitter may be divided into several segments. Each segment may correspond to at least one receiver. For example, when the audio signal is "Transmit mathematical achievement to user A and transmit linguistic achievement to user B", the audio signal may be divided into two segments and transmitted to user A and user B, respectively. In another embodiment, when the audio signal is "A and B, my bank account is XXXXXX; C, my mailbox password is XXXXXX; and D, E and F, my QQ number is XXXXXX", it may be divided into a first segment corresponding to receivers A and B, a second segment corresponding to receiver C, and a third segment corresponding to receivers D, E, and F.

Figure 6:
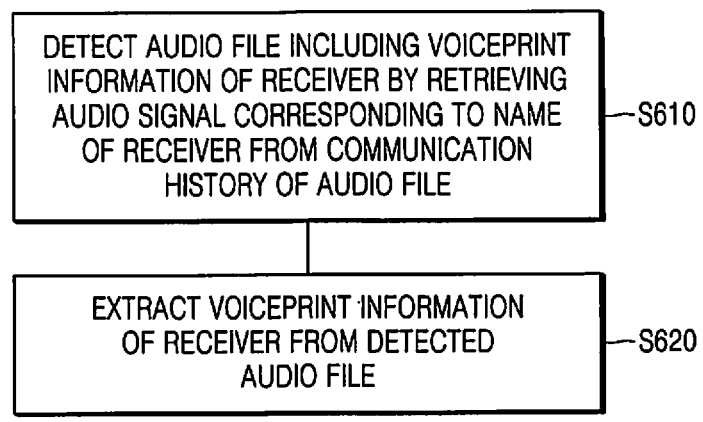
FIG. 6 is a flowchart illustrating a process of detecting voiceprint information in an audio signal of a receiver in an audio communication method using an electronic device according to an embodiment.

FIG. 6 is a flowchart illustrating a process of detecting voiceprint information in an audio signal of a receiver in an audio communication method using an electronic device according to an embodiment.

In operation S610, an audio signal corresponding to the name of the receiver may be retrieved from a communication history of an audio file to detect an audio file including the voiceprint information of the receiver. In an embodiment, when there are several receivers, it may search for each audio file corresponding to each receiver. In an embodiment, the audio file corresponding to each receiver may include an audio file in a local memory received in the previous audio communication, a video file, and an audio file in the video file. In an embodiment, the video file may be related to a contact address in an address book.

In operation S620, the voiceprint information of the receiver may be extracted from the detected audio file. According to an embodiment, the voiceprint information may be extracted from the audio file by using an i-vector method; however, the present disclosure is not limited thereto.

In an embodiment, when the characteristic information of the receiver is at least one of the fingerprint information, the face information, the vein pattern information, the palm print information, and the iris information, an image file related to at least one of the fingerprint information, the face information, the vein pattern information, the palm print information, and the iris information corresponding to the receiver may be selected in a previously received or stored image file. Next, at least one of the fingerprint information, the face information, the vein pattern information, the palm print information, and the iris information of the receiver may be extracted from the selected image file.

In an embodiment when it is detected that the audio signal includes the sensitive information, at least one of the voiceprint information, the fingerprint information, the face information, the vein pattern information, the palm print information, and the iris information of the receiver may be requested from the user before encrypting the audio signal of the transmitter and transmitting the encrypted audio signal.

In an embodiment, when there is one receiver of the audio signal of the transmitter, all audio signals, that is, all sentences spoken by the transmitter, may be encrypted by using the characteristic information of the receiver.

According to an embodiment, only the sensitive information in the audio signal may be encrypted by using the voiceprint information of the receiver.

In an embodiment, when a plurality of receivers receive the same audio signal, the audio signal may be encrypted by using the characteristic information of each receiver, and the encrypted audio signal may be transmitted to each receiver. In this case, each receiver may decrypt the audio signal by using its own characteristic information.

In an embodiment, the characteristic information of each receiver may be used to encrypt each of the sensitive information among the various sensitive information in the audio signal. When some segments of the audio signal are transmitted to some receivers and other segments are transmitted to other receivers, the characteristic information of the receiver may be used to encrypt each segment of the audio signal corresponding to the receiver. In this case, in an embodiment, the voiceprint information may be applied to the audio signal encryption by using an encrypting algorithm such as a BlowFish algorithm, and the encrypting method is not limited thereto and other encrypting methods related to the voiceprint information may also be used.

In an embodiment, when the encrypted audio signal is transmitted, a shielded audio file or a blank audio file may be transmitted together with the audio signal. The shielded audio file may be used to protect the encrypted audio signal or to protect the encrypted sensitive information in the audio signal. When the receiver is unable to decrypt the encrypted audio signal or the encrypted sensitive information in the audio signal, the receiver may hear the audio signal of the shielded audio file or the blank audio file instead of hearing the noise.

Figure 7:
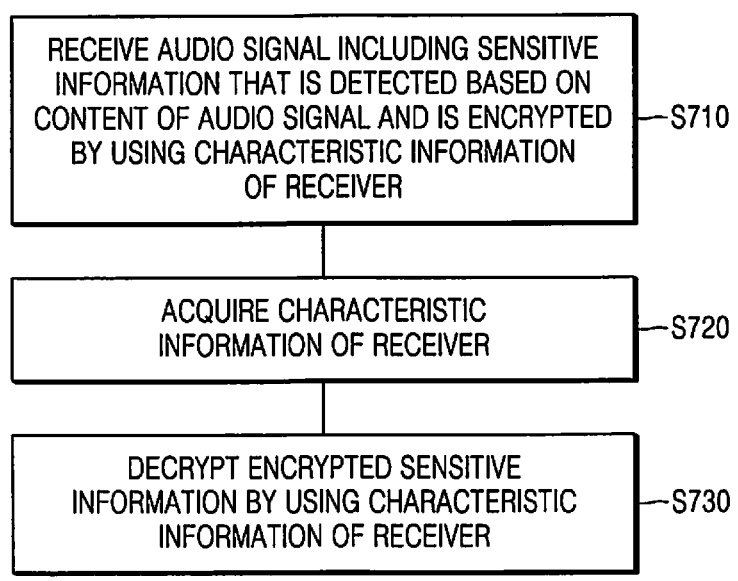
FIG. 7 is a flowchart of an audio communication method using an electronic device according to an embodiment.

FIG. 7 is a flowchart of an audio communication method using an electronic device according to an embodiment.

In operation S710, an audio signal including the sensitive information detected based on the content of the audio signal and encrypted by using the characteristic information of the receiver may be received. In an embodiment, the audio signal may be an entirely-encrypted audio signal or a partially-encrypted audio signal including the sensitive information.

In an embodiment, it may be determined whether the audio signal includes an encrypted audio signal. Herein, the type of an encoding method of the audio signal may be used to detect whether the audio signal includes the encrypted audio signal. For example, when the encoding method of the audio signal is an encoding method generally used by the electronic device of the present disclosure, it may be determined that the audio signal does not include the encrypted audio signal. When the encoding method of the audio signal is an encoding method that is not generally used by the electronic device of the present disclosure, it may be determined that the audio signal includes the encrypted audio signal. When the audio signal is not an encrypted audio signal, the audio signal may be directly played to the receiver.

In operation S720, the characteristic information of the receiver may be acquired. The characteristic information of the receiver may include, but is not limited to, at least one of voiceprint information, fingerprint information, face information, vein pattern information, palm print information, and iris information of the receiver. For example, when the voiceprint information is used as the characteristic information, the voiceprint information in the audio signal of the receiver may be detected in operation S720.

In an embodiment, when the characteristic information of the receiver is at least one of the fingerprint information, the face information, the vein pattern information, the palm print information, and the iris information, an image file corresponding to the receiver may be determined in a previously received or stored image file and at least one of the fingerprint information, the face information, the vein pattern information, the palm print information, and the iris information may be acquired from the determined image file.

In an embodiment, the receiver may directly request the fingerprint information, the face information, the vein pattern information, the palm print information, or the iris information of the receiver from the receiver.

In operation S730, the encrypted sensitive information may be decrypted by using the characteristic information of the receiver.

According to an embodiment, a decrypting method of operation S730 may correspond to an encrypting method for encrypting the audio signal.

In an embodiment, after the encrypted audio signal is decrypted, the decrypted audio signal may be played for the receiver. Also, while playing the decrypted audio signal, a shielded audio file or a blank audio file received together with the audio signal may also be played.

Figure 8:
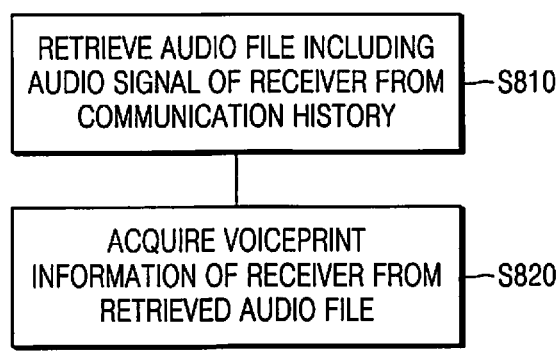
FIG. 8 is a flowchart illustrating a process of acquiring voiceprint information from an audio signal of a receiver in an audio communication method using an electronic device according to an embodiment.

FIG. 8 is a flowchart illustrating a process of acquiring voiceprint information from an audio signal of a receiver in an audio communication method using an electronic device according to an embodiment.

In operation S810, an audio file including the audio signal of the receiver may be retrieved from the communication history.

In operation S820, the voiceprint information of the receiver may be acquired from the retrieved audio file. In an embodiment, the voiceprint information may be extracted from the audio file by using an i-vector method; however, the present disclosure is not limited thereto. Other methods may also be used to extract the voiceprint information from the audio file.

Figure 9:
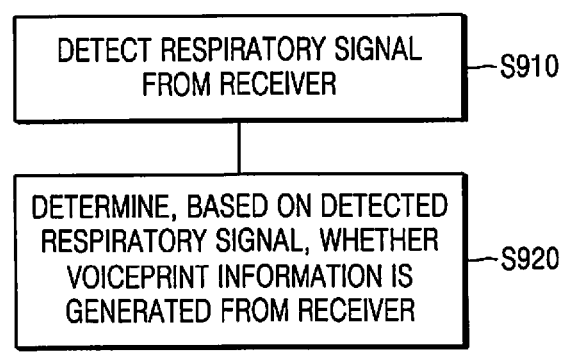
FIG. 9 is a flowchart illustrating another process of acquiring voiceprint information from an audio signal of a receiver in an audio communication method using an electronic device according to an embodiment.

FIG. 9 is a flowchart illustrating another process of finding voiceprint information from an audio signal of a receiver in an audio communication method using an electronic device according to an embodiment.

In an embodiment, the order of operations S910 and S920 of FIG. 9 may differ from that of FIG. 9, and only some of the operations S910 and S920 may be performed.

In operation S910, a respiratory signal from the receiver may be detected. In an embodiment, a request may be transmitted to the receiver by using audio synthesis or text information depending on an audio communication platform. For example, in a communication platform of a text interface, a dialog box may be popped up to request the receiver to provide an audio signal. In an embodiment, in a communication platform of a textless pure audio interface, synthesized audio may be played to request the receiver to provide an audio signal.

In an embodiment, a respiratory signal may be detected in the audio signal provided by the receiver. For example, a sensor of a pressure sensing device may be used to detect the respiratory signal; however, the present disclosure is not limited thereto.

In operation S920, based on the detected respiratory signal, it may be possible to determine whether the voiceprint information is generated from the receiver. In an embodiment, a machine learning algorithm such as a support vector machine may be used to determine whether the audio signal actually includes the voiceprint information of the receiver; however, a method of determining whether the audio signal actually includes the voiceprint information of the receiver is not limited thereto.

In an embodiment, by using the result of determining, based on the detected respiratory signal, whether the audio signal provided from the receiver actually includes the voiceprint information of the receiver, a state indicator indicating whether the audio signal is an actual audio signal may be used. For example, when the audio signal is an actual audio signal, the state indicator may indicate 1, and when the audio signal does not actually include the voiceprint information of the receiver like a recorded audio signal, the state indicator may indicate 0.

In an embodiment, the voiceprint information of the receiver may be acquired from the audio signal provided by the receiver. In an embodiment, when it is determined that the audio signal provided by the receiver does not actually include the voiceprint information of the receiver, a shielded audio file or a blank audio file may be used to protect the encrypted audio signal. For example, it may be possible to prevent noise from being generated while an encrypted portion is played by playing a predetermined audio file while playing the received audio signal.

Figure 10:
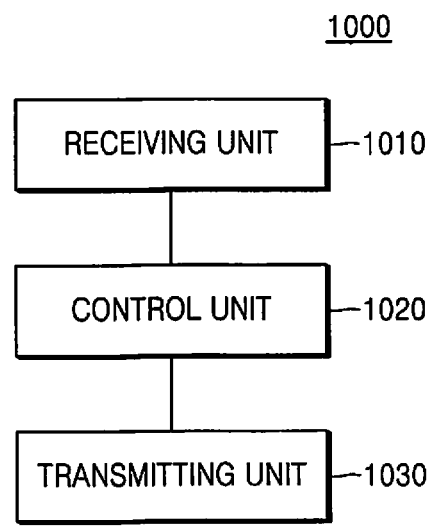
FIG. 10 is a schematic diagram illustrating a structure of an electronic device for audio communication according to an embodiment.

FIG. 10 is a schematic diagram illustrating a structure of an electronic device for audio communication according to an embodiment.

In an embodiment, an electronic device 1000 may include a receiving unit 1010, a control unit 1020, and a transmitting unit 1030.

The receiving unit 1010 may receive an audio signal from a transmitter.

In an embodiment, the control unit 1020 may detect sensitive information in the audio signal based on the content of the audio signal.

In an embodiment, when the audio signal of the transmitter includes a predetermined important keyword or a predetermined important keyword type, the control unit 1020 may determine that the audio signal of the transmitter includes the sensitive information. In an embodiment, the control unit 1020 may determine whether the audio signal of the transmitter includes the sensitive information based on the context in a communication history of the audio signal of the transmitter. In another embodiment, the control unit 1020 may detect whether the audio signal of the transmitter includes the sensitive information based on the audio characteristic of the audio signal of the transmitter.

In an embodiment, the control unit 1020 may identify the audio signal of the transmitter as a word list and perform a semantic analysis on the identified word list to detect whether the audio signal of the transmitter includes the sensitive information. In particular, the control unit 1020 may text-match the identified word list with a predetermined keyword or keyword type to detect whether the audio signal of the transmitter includes the sensitive information. As a result of the text match, when a portion of the identified word list matches the predetermined keyword or keyword type, it may be possible to detect that the audio signal includes the sensitive information.

In an embodiment, the control unit 1020 may set a state indicator indicating whether the audio signal includes the sensitive information based on the detection result. For example, when detecting that the audio signal includes the sensitive information, the control unit 1020 may display the state indicator as 1. When it is determined that the audio signal does not include the sensitive information, the control unit 1020 may display the state indicator as 0.

In an embodiment, the control unit 1020 may extract the characteristic information of the receiver. The characteristic information of the receiver may include, but is not limited to, at least one of voiceprint information, fingerprint information, face information, vein pattern information, palm print information, and iris information of the receiver. In the case of treating the voiceprint information as the characteristic information, the control unit 1020 may retrieve a communication history of the audio file about the receiver corresponding to "the name of the receiver" in the audio signal of the transmitter and extract the voiceprint information of the receiver from the retrieved audio signal or file.

In an embodiment, when the control unit 1020 determines that there are a plurality of receivers, the control unit 1120 may retrieve each audio file corresponding to each receiver and extract the voiceprint information of the corresponding receiver from each retrieved audio file.

In an embodiment, when the characteristic information of the receiver is at least one of the fingerprint information, the face information, the vein pattern information, the palm print information, and the iris information, the control unit 1020 may determine an image file corresponding to the receiver among the previously received or stored image files and then extract the fingerprint information, the face information, the vein pattern information, the palm print information, or the iris information of the receiver from the determined image file.

In an embodiment, when the audio signal includes the sensitive information, the control unit 1020 may encrypt the sensitive information or the audio signal including the sensitive information and request the receiver to provide the voiceprint information, the fingerprint information, the face information, the iris information, the vein pattern information, the palm print information, or other information of the receiver before transmitting the encrypted sensitive information or the encrypted audio signal including the sensitive information.

In an embodiment, the control unit 1020 may encrypt the audio signal of the transmitter by using the extracted characteristic information.

In an embodiment, when there is only one receiver of the audio signal of the transmitter, that is, in the case of one-to-one audio communication, the control unit may not perform an operation of determining the receiver of the audio signal.

In an embodiment, the characteristic information accessible by the control unit 1020 may be only used to encrypt the audio signal or the sensitive information of the audio signal.

In an embodiment, when there are a plurality of receivers of the audio signal of the transmitter, the control unit 1020 may encrypt each divided audio signal segment corresponding to each receiver by using the characteristic information of each receiver among the plurality of receivers. The control unit 1020 may encrypt sensitive information in the audio signal by using the characteristic information of each receiver. The control unit 1020 may encrypt each sensitive information in the audio signal by using the characteristic information of each receiver.

In an embodiment, the electronic device 1000 may include the transmitting unit 1030 for transmitting the encrypted audio signal. When transmitting the encrypted audio signal, the transmitting unit may transmit a shielded audio file together with the audio signal. The shielded audio file may be used to protect the encrypted audio signal or the encrypted sensitive information in the audio signal. In an embodiment, when the receiver may not decrypt the encrypted audio signal or may not decrypt the encrypted sensitive information in the audio signal, the receiver may hear the shielded audio file or the blank audio file instead of the noise.

Figure 11:
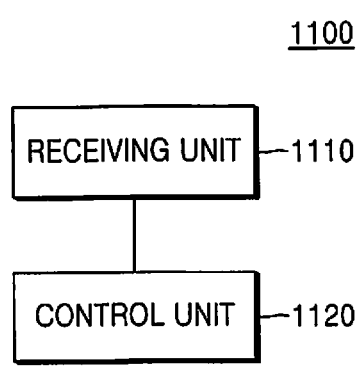
FIG. 11 is a schematic diagram illustrating a structure of an electronic device for audio communication according to an embodiment.

FIG. 11 is a schematic diagram illustrating a structure of an electronic device for audio communication according to an embodiment.

In an embodiment, an electronic device 1100 may include a receiving unit 1110 and a control unit 1120.

The receiving unit 1110 may receive an audio signal including the sensitive information detected based on the content of the audio signal and encrypted by using the characteristic information of the receiver. In an embodiment, the received audio signal may be an audio signal not including an encrypted audio signal or may be an audio signal including an encrypted audio signal.

In an embodiment, the control unit 1120 may detect whether the received audio signal is an encrypted audio signal. The control unit 1120 may detect whether the audio signal is an encrypted audio signal by using an encoding mode of the audio signal. For example, when the encoding method of the audio signal is an encoding method generally used by the electronic device of the present disclosure, it may be determined that the audio signal does not include the encrypted audio signal. When the encoding method of the audio signal is an encoding method that is not generally used by the electronic device of the present disclosure, it may be determined that the audio signal includes the encrypted audio signal.

In an embodiment, the control unit 1120 may play an audio signal for the receiver when the audio signal is not an encrypted audio signal.

In an embodiment, when detecting that the audio signal of the transmitter is an encrypted audio signal, the control unit 1120 may acquire the characteristic information of the receiver. The characteristic information of the receiver may include, but is not limited to, voiceprint information, fingerprint information, face information, vein pattern information, palm print information, or iris information of the receiver.

In an embodiment, when the voiceprint information is assumed to be the characteristic information, the control unit 1120 may retrieve the audio file including the audio signal of the receiver from the communication history and acquire the voiceprint information of the receiver from the retrieved audio file.

In an embodiment, the control unit 1120 may decrypt the encrypted sensitive information by using the characteristic information of the receiver. Herein, a decrypting method used by the control unit 1120 may correspond to an encrypting method used to encrypt the audio signal. In an embodiment, when the audio signal including the sensitive information is encrypted, it may decrypt the audio signal.

In an embodiment, after decrypting the encrypted audio signal, the control unit 1120 may play the decrypted audio signal for the receiver.

In an embodiment, when failing to decrypt the encrypted audio signal of the transmitter, the control unit 1120 may use a predetermined audio file to protect the encrypted audio signal. In an embodiment, the predetermined audio file may include, but is not limited to, a shielded audio file or a blank audio file. The shielded audio file or the blank audio file may be transmitted from an encrypting device to a decrypting device together with the encrypted audio signal. Next, the control unit 1120 may play the shielded audio file or the blank audio file for the receiver.

The control unit 1120 may detect the voiceprint information by using the following processes. In an embodiment, the control unit 1120 may request the receiver to provide an audio signal. In response to the request, the receiver may provide an audio signal. In an embodiment, the control unit 1120 may detect a respiratory signal in the audio signal provided by the receiver and determine whether the audio signal provided by the receiver actually includes the voiceprint information of the receiver based on the respiratory signal. When it is determined that the audio signal provided by the receiver actually includes the voiceprint information of the receiver, the control unit 1120 may extract the voiceprint information of the receiver from the audio signal provided by the receiver. However, when it is determined that the audio signal provided by the receiver does not actually include the voiceprint information of the receiver, the control unit 1120 may use a predetermined audio file to protect the encrypted audio signal. In an embodiment, the predetermined audio file may include, but is not limited to, a shielded audio file or a blank audio file.

In an embodiment, when the characteristic information of the receiver is the fingerprint information, the face information, the vein pattern information, the palm print information, or the iris information, the control unit 1120 may determine an image file corresponding to the receiver among the previously received or stored image files and acquire the fingerprint information, the face information, the vein pattern information, the palm print information, or the iris information of the receiver from the determined image file.

In an embodiment, the control unit 1120 may directly request the fingerprint information, the face information, the iris information, the vein pattern information, the palm print information, or other information of the receiver from the receiver.

Figure 12:
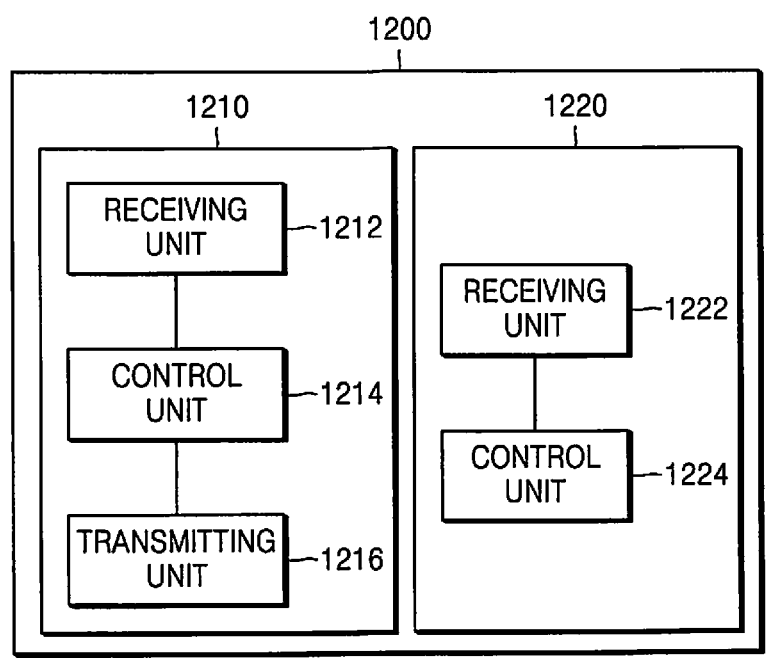
FIG. 12 is a schematic diagram illustrating a structure of an audio communication encrypting and decrypting system according to an embodiment.

FIG. 12 is a schematic diagram illustrating a structure of an audio communication encrypting and decrypting system according to an embodiment.

In an embodiment, an audio communication encrypting and decrypting system 1200 may include an audio communication encrypting device 1210 and an audio communication decrypting device 1220. The audio communication encrypting device 1210 may include a receiving unit 1212, a control unit 1214, and a transmitting unit 1216.

Since the receiving unit 1212, the control unit 1214, and the transmitting unit 1216 perform the same operations as the receiving unit 1010, the control unit 1020, and the transmitting unit 1030 of FIG. 10, redundant descriptions thereof will be omitted for conciseness.

The receiving unit 1212 may receive an audio signal from a transmitter.

In an embodiment, the control unit 1214 may detect sensitive information in the audio signal based on the content of the audio signal.

In an embodiment, the control unit 1214 may encrypt the sensitive information by using the characteristic information of the receiver.

In an embodiment, the transmitting unit 1216 may transmit an audio signal including the encrypted sensitive information.

The audio communication decrypting device 1220 may include a receiving unit 1222 and a control unit 1224.

Since the receiving unit 1222 and the control unit 1224 perform the same operations as the receiving unit 1110 and the control unit 1120 of FIG. 11, redundant descriptions thereof will be omitted for conciseness.

The receiving unit 1222 may receive an audio signal including the sensitive information detected based on the content of the audio signal and encrypted by using the characteristic information of the receiver. The received audio signal may be an audio signal not including an encrypted audio signal or may be an audio signal including an encrypted audio signal.

In an embodiment, the control unit 1224 may acquire the characteristic information of the receiver. The characteristic information of the receiver may include, but is not limited to, voiceprint information, fingerprint information, face information, vein pattern information, palm print information, or iris information of the receiver.

In an embodiment, the control unit 1224 may decrypt the encrypted sensitive information by using the characteristic information of the receiver. Herein, a decrypting method used by the control unit 1224 may correspond to an encrypting method used to encrypt the audio signal.

In an embodiment, the communication method using the electronic devices 1000 and 1100, the electronic devices 1000 and 1100, and the audio communication encrypting and decrypting system may have the following characteristics. First, it may be possible to reduce the calculation cost by encrypting only the sensitive information in the audio signal during the encrypting process. Next, the confidentiality of the audio communication may be improved because the audio signal is encrypted or decrypted by using the characteristic information of the receiver. Next, by detecting the respiratory signal of the receiver in the audio file or the audio signal provided by the receiver during the decrypting process, since it may be possible to determine that the audio file or the audio signal provided by the receiver is not a recorded audio file or a recorded audio signal but an audio file or an audio signal actually derived from the receiver, the confidentiality of the audio communication may be further improved. In an embodiment, the electronic device may distinguish whether it is a human's voice or a recorder's voice based on the air pressure.

In an embodiment, an audio communication encrypting method and an audio communication decrypting method may be performed in hardware, firmware, software, computer codes, or any combination thereof. In addition, the software or the computer codes may be stored in non-transitory recording mediums (e.g., read-only memories (ROMs), random-access memories (RAMs), CD-ROMs, magnetic tapes, floppy disks, optical data storage devices, and carriers (e.g., data transmission through the Internet) or computer codes downloaded from the network. The computer codes may be initially stored in remote recording mediums, computer-readable recording mediums, or non-transitory machine-readable mediums, and then may be stored in local recording mediums. Next, the above methods may be performed by software, computer codes, software modules, software objects, instructions, application programs, applets, apps, and the like, which may be stored in recording mediums by using general-purpose computers, digital computers, or dedicated processors.

In an embodiment, the above methods may be performed by programmable hardware or dedicated hardware (e.g., application-specific integrated circuit (ASIC) or field-programmable gate array (FPGA)). It may be easily understood by those of ordinary skill in the art that the computer, processor, microprocessor controller, or programmable hardware may include volatile and/or nonvolatile memory and memory components (e.g., RAMs, ROMs, and flash memories). The memory and memory components may store or receive software or computer codes. When accessed and executed by the computer, the processor or hardware or the software or computer codes may perform the above processing methods.

In an embodiment, when a general-purpose computer accesses a code used to perform the above process, the execution of the code may convert the general-purpose computer into a dedicated computer that performs the above process.

In an embodiment, the program may be transmitted in an electronic mode by any medium through which communication signals are transmitted by wire/wireless and equivalents thereof. The programs and the computer-readable recording mediums may be distributed in computer systems connected to the network. Next, the computer-readable codes may be stored and executed in a distributed manner.

The foregoing is merely illustrative of the embodiments, and the present disclosure is not limited thereto. Although the embodiments have been described above, those of ordinary skill in the art will readily understand that various modifications may be made therein without materially departing from the spirits and features of the present disclosure. Therefore, it is to be understood that the embodiments described above should be considered in a descriptive sense only and not for purposes of limitation. For example, elements described as being combined may also be implemented in a distributed manner, and elements described as being distributed may also be implemented in a combined manner.

The scope of the disclosure may be represented by the following claims, and it should be understood that the present disclosure may also include all changes or modifications derived from the spirit and scope of the following claims and equivalents thereof.

The invention claimed is:

1. A communication method for performing communication between more than two parties, using an electronic device, the communication method comprising:
receiving, by the electronic device, an audio signal of a transmitter;
detecting, by the electronic device, sensitive information in the audio signal based on a context of another audio signal in a communication history of the transmitter;
determining, by the electronic device, a receiver to receive the audio signal;
encrypting, by the electronic device, the sensitive information by using characteristic information of the determined receiver; and
transmitting, by the electronic device, the audio signal including the encrypted sensitive information.

2. The communication method of claim 1, wherein the content of the audio signal is a meaning of the audio signal or an audio characteristic of the audio signal.

3. The communication method of claim 1, wherein the content of the audio signal is a meaning of the audio signal, and
detecting the sensitive information based on the meaning of the audio signal comprises detecting the sensitive information based on whether the audio signal of the transmitter comprises a predetermined important keyword or a predetermined important keyword type.

4. The communication method of claim 1, wherein the receiver is determined based on a name of the receiver detected in the audio signal, or the context of the other audio signal in the communication history of the transmitter.

5. The communication method of claim 1, wherein the characteristic information of the receiver comprises at least one of voiceprint information, fingerprint information, face information, vein pattern information, palm print information, and iris information of the receiver.

6. A communication method for performing communication between more than two parties, using an electronic device, the communication method comprising:
receiving, by the electronic device, an audio signal comprising sensitive information that is detected based on a context of another audio signal in a communication history of a transmitter, and is encrypted by using characteristic information of a receiver, wherein the receiver is determined by the transmitter to receive the audio signal;

acquiring, by the electronic device, the characteristic information of the receiver; and decrypting, by the electronic device, the encrypted sensitive information by using the characteristic information of the receiver.

7. The communication method of claim 6, wherein the content of the audio signal is a meaning of the audio signal or an audio characteristic of the audio signal of the transmitter.

8. The communication method of claim 6, wherein the characteristic information comprises at least one of voiceprint information, fingerprint information, face information, vein pattern information, palm print information, and iris information of the receiver, and acquiring the voiceprint information comprises:
detecting a respiratory signal from the receiver; and
determining, based on the respiratory signal, whether the voiceprint information is generated from the receiver.

9. An electronic device for performing communication between more than two parties comprising at least one processor configured to:

receive an audio signal of a transmitter;

detect sensitive information in the audio signal based on a context of another audio signal in a communication history of the transmitter;

determine a receiver to receive the audio signal, encrypt the sensitive information by using characteristic information of the determined receiver; and transmit the audio signal including the encrypted sensitive information.

10. The electronic device of claim 9, wherein the content of the audio signal is a meaning of the audio signal or an audio characteristic of the audio signal.

11. The electronic device of claim 9, wherein the at least one processor is further configured to determine the receiver of the audio signal based on a name of the receiver detected in the audio signal, or the context of the other audio signal in the communication history of the transmitter.

12. An electronic device for performing communication between more than two parties comprising at least one processor configured to:

receive an audio signal comprising sensitive information that is detected based on a context of another audio signal in a communication history of a transmitter, and is encrypted by using characteristic information of a receiver, wherein the receiver is determined by the transmitter to receive the audio signal;

acquire the characteristic information of the receiver; and decrypt the encrypted audio signal by using the characteristic information of the receiver.

13. The electronic device of claim 12, wherein the content of the audio signal is a meaning of the audio signal or an audio characteristic of the audio signal.

14. The electronic device of claim 12, wherein the characteristic information comprises at least one of voiceprint information, fingerprint information, face information, vein pattern information, palm print information, and iris information of the receiver, and the at least one processor is further configured to detect a respiratory signal from the receiver when the voiceprint information is acquired, and determine, based on the detected respiratory signal, whether the voiceprint information is generated from the receiver.

15. A computer program product comprising a non-transitory computer-readable storage medium having a computer-readable program stored therein, wherein the computer-readable program, when executed on a computing device, causes the computing device to:

receive an audio signal of a transmitter;

detect sensitive information in the audio signal based on a context of another audio signal in a communication history of the transmitter;

determine a receiver to receive the audio signal;

encrypt the sensitive information by using characteristic information of the determined receiver; and transmit the audio signal including the encrypted sensitive information.

* * * * *